Patented July 26, 1938

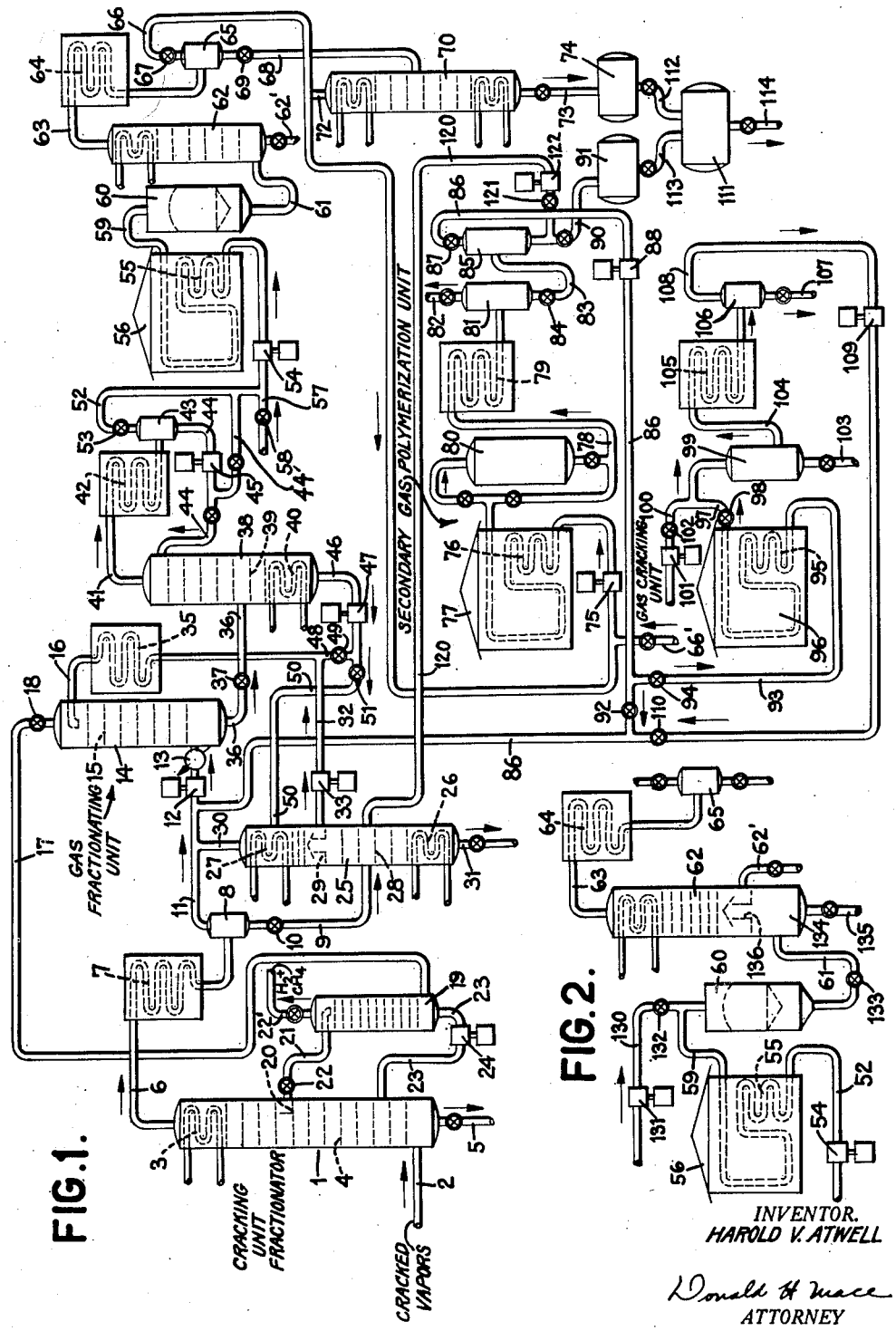

2,125,235

UNITED STATES PATENT OFFICE 2,125,235

TREATMENT OF HYDROCARBON GASES

Harold V. Atwell, White Plains, N. Y., assignor to Process Management Company Inc., New York, N. Y., a corporation of Delaware Application October 31, 1934, Serial No. 750,857

6 Claims. (Cl. 196—10)

My invention relates to the treatment of hydrocarbon gases and more particularly to the conversion of such gases to low-boiling normally liquid hydrocarbons suitable for use as motor fuel.

It is known that hydrocarbon gases containing olefinic constituents such for example as ethylene, propylene and butylene can be effectively polymerized by subjecting them to elevated temperature under high pressure, with resultant formation of low boiling normally liquid hydrocarbons which are high in an anti-knock value and can be used as motor fuel. Where, however, as in the usual instance, the source of the hydrocarbon gases comprises uncondensible gases produced in the cracking of hydrocarbon oil, such polymerization under the influence of heat and pressure tends to produce a product containing a relatively large portion of light ends.

It is also known that polymerization of such gases can be promoted even under lower temperature and pressure conditions by means of certain catalysts, prepared by combining a metallic halide with a polar compound, such as sodium chloride, and a catalyst which has been found especially suitable for this purpose comprises a sodium aluminum chloride ($NaAlCl_3$). This catalyst has been found to be especially effective and useful for the polymerization of propylene and butylene, but has little or no effect upon the polymerization of ethylene and owing to this fact the liquid products of polymerization in a catalytic gas polymerization operation of this character tend to be deficient in lower boiling constituents or light ends.

It is therefore an object of my invention to provide a gas polymerization process in which hydrocarbon gases containing gaseous olefins may be polymerized to produce a low-boiling normally liquid product having a satisfactory balance or distribution between relatively low-boiling and relatively high-boiling constituents.

A further object of my invention is to provide an improved process for concentrating olefinic gases, such as those produced in an oil-cracking operation prior and preparatory to the polymerization of the gases.

My invention has for further objects such additional improvements in operative advantages and results as may hereinafter be found to obtain.

My invention contemplates subjecting olefinic gases, such as cracking-plant gases which have previously been subjected to fractionation to remove hydrogen and methane, to polymerization at moderately elevated temperatures and pressures in the presence of a catalyst comprising a sodium aluminum chloride, separating liquid products of polymerization from the unpolymerized gases and subjecting these gases to further polymerization under the influence of high temperature and pressure to effect a polymerization of such constituents, as for example, ethylene, which remain unpolymerized in the initial gas polymerization step, followed by separation of the liquid products of polymerization and blending the liquid products of polymerization from both gas polymerization operations to form a balanced motor fuel.

My invention further contemplates recycling residual gases remaining after both polymerization operations, after fractionation to remove hydrogen and methane and also if desired after cracking to increase the olefinic content thereof, to the initial or catalytic gas polymerization step.

My invention further contemplates, when cracking-plant gases are used as a source of olefins for polymerization, the fractionation of the cracking-plant gases by means of a liquefied butane fraction circulated through an absorber-stripper cycle, the butane solvent being supplied from the stabilizing unit of the oil-cracking unit, and residual gases from the gas-fractionating unit being scrubbed with a suitable secondary solvent from the fractionating tower of the oil-cracking unit to remove butane, together with the return of the butane-enriched secondary solvent to the oil-cracking unit for recovery of the butane.

In order that my invention may be more clearly set forth and understood, I now describe, with reference to the accompanying drawing forming a part of this specification, various preferred forms and manners in which my invention may be practiced and embodied. In this drawing, Fig. 1 is a more or less diagrammatic elevational view of apparatus for carrying out the process of my invention in a preferred embodiment, the figure being intended to serve primarily as a flow diagram illustrative of my process; and Fig. 2 is a similar view of an alternative form of a portion of the apparatus illustrated in Fig. 1.

Similar reference numerals designate similar parts in both of the views of the drawing.

Referring now to the figures, vapors from an oil-cracking unit which have previously been freed from heavy tarry or residual constituents enter the fractionator 1 from the cracking unit through a line 2. The fractionator 1 is provided with suitable cooling means, such as a cooling coil 3, and with conventional plates or trays 4 for assisting in the fractionation. As the vapors pass upward through the fractionator 1 they are partially condensed and fractionated to separate constituents heavier than gasoline, i. e., gas oil, which is removed from the fractionator 1 through a valved line 5. Overhead vapors from the fractionator 1 pass through a vapor line 6 to a condenser 7 and a separator 8, gasoline condensate being removed from the separator 8 through a line 9 having a valve 10 while the gases escape from the separator 8 through a line 11.

The gases withdrawn from the separator 8 contain hydrogen, methane, higher paraffins such as ethane, propane and butane and also gaseous olefins such as ethylene, propylene and butylene, the concentration of gaseous olefins being dependent upon the conditions obtaining in the oil-cracking system in which the gases have been produced. Before effecting the polymerization of the gases it is desirable to eliminate hydrogen and methane as far as possible.

For this purpose, the gases pass to a compressor 12 located in the line 11, where they are compressed, for example to a pressure of from 100 to 300 pounds per square inch or more. The compressed gases are then cooled in a cooler 13, for example to a temperature in the neighborhood of 100° F., and the cooled compressed gases then enter a scrubber 14, which may be of conventional type, preferably internally provided with plates or trays or other gas-and-liquid contact devices 15. As the gases pass upward through the scrubber 14 they are subjected to counter-current scrubbing by means of liquefied light hydrocarbons of the general boiling range of butane and/or pentane, and including corresponding olefins, which is introduced into the scrubber 14 through a line 16 in sufficient amount to effect an absorption of constituents heavier than methane. The scrubbed residual gases, comprising largely hydrogen and methane, but containing also some solvent, are removed from the scrubber 15 through a line 17 having a valve 18 and passed to a secondary scrubber 19, the purpose of which is to effect the re-absorption and recovery of any solvent contained in the gases leaving the scrubber 15.

In the preferred instance shown, the gases entering the secondary scrubber 19 are washed with a heavy naphtha fraction withdrawn from a weir 20 in the fractionator 1. This fraction passes from the weir 20 through a line 21 having a valve 22 into the upper portion of the scrubber 19 and descends through the latter in counter-current to the rising gases, thus effecting a removal of butane and the like therefrom. Residual gases, comprising principally hydrogen and methane, are removed from the secondary scrubber 19 through a valved line 22', while the butane-enriched solvent is removed from the bottom of the scrubber 19 through a line 23 and delivered by means of a pump 24 located in the line 23 to the fractionator 1.

The gasoline condensate removed from the separator 8 through the line 9 passes to a stabilizer 25 which is provided with a heating coil 26 located in the bottom thereof, cooling means such as a cooling coil 27 located in the upper portion thereof, suitable plates or trays 28 and a trap-out tray 29. In the stabilizer 25 the gasoline is subjected to re-distillation and re-fractionation to remove light constituents and gases undesired in the final gasoline product. Overhead vapors from the stabilizer 25 pass through a line 30 and through the line 11 to the scrubber 15, while the stabilized gasoline is withdrawn from the bottom of the stabilizer 25 through a valved line 31. The operation of the stabilizer 25 is so conducted and the trap-out tray 29 is so located that a fraction comprising principally butane, pentane and corresponding olefins is withdrawn from the trap-out tray 29, and this fraction passes through a line 32 wherein is located a pump 33 into the line 16 and thence through a cooler 35 into the scrubber 15, where it serves to remove gaseous constituents having heavier molecular weights than methane from the gases entering the scrubber 15, as aforesaid.

The enriched solvent reaching the bottom of the scrubber 15 is withdrawn through a line 36 having a valve 37 and passes to a stripper 38, which is internally provided with plates or trays 39 and with heating means such as heating coil 40 located in the bottom thereof. In the stripper 38 the enriched butane solvent is re-distilled and re-fractionated to drive off absorbed vapors and gases, the liberated vapors and gases passing through a line 41 to a condenser 42 and a separator 43 from which a portion of the condensate is returned through a valved line 44 and a pump 45 to the upper portion of the stripper 38. The stripped butane fraction reaching the bottom of the stripper 38 passes by way of a line 46, wherein is located a pump 47, either through a branch line 48 having a valve 49 to the line 16 and thence into the scrubber 15, or through a branched conduit 50 having a valve 51 into the upper portion of the stabilizer 25. By regulating the valves 49 and 51 the proportions of the butane returned to the scrubber 14 and stabilizer 25 respectively may be varied as desired. For example, all of this stripped fraction may be returned to the stabilizer 25.

The gases removed from the separator 43, which have been concentrated in olefinic constituents by reason of the removal of hydrogen and methane therefrom, pass by way of a line 52 having a valve 53 and a pump 54 into a heating coil 55 located in a furnace 56. Additional olefinic gases from an outside source (not shown) may also be introduced into the line 52 for delivery to the coil 55 by means of a line 57 having a valve 58. A portion of the condensate withdrawn from the separator 43 may also be delivered, by way of a valved line 44', to the line 52 and thence to the coil 55, where it will be vaporized before passing to the reaction chamber 60.

The gases passing through the coil 55 are preferably heated to a temperature of from 300° to 400° F., under a pressure of from 500 to 1000 pounds per square inch, and at this temperature and under this pressure pass through a line 59 into a reaction zone or chamber 60 containing a supply of catalyst.

As catalysts for this purpose I prefer to employ metallic halides which have been treated to form complex molecular compounds by means of polar compounds. Thus, a metallic halide such as aluminum chloride may be treated with a halide of an alkali metal such as sodium chloride, to form sodium aluminum chloride (NaClAlCl₃). Other metallic halides, such as ferric chloride and boric trifluoride, and other polar compounds such as potassium chloride, sodium bromide or postassium bromide may be used. The preferred sodium aluminum chloride catalyst may be prepared by fusing equi-molecular proportions of anhydrous sodium chloride and aluminum chloride and is preferably suspended for use on an inert carrier such as pumice or other granular material, preferably from 10 to 20 mesh per inch in size. It will be understood that while I have shown the catalyst as located in a reaction chamber 60 of more or less conventional type, contact between the catalyst and the gases may be obtained in any convenient manner and by means of any convenient apparatus which may be cooled if desired to remove excess heat of reaction. Preferably the time of contact between the gases and the catalyst is of the order of 100 seconds but may vary from about 50 to 200 seconds, as desired.

The products then pass from the reaction chamber 60 through a line 61 to a fractionator 62, from which products heavier than gasoline are withdrawn through a valved line 62', and thence through a line 63 to a condenser 64 and a separator 65, from which unpolymerized gases are withdrawn through a line 66 having a valve 67. Liquid products of polymerization are withdrawn from the separator 65 through a line 68 having a valve 69 and pass to a conventional stabilizer 70, from which overhead gases return by way of a line 72 to the line 66 while stabilized motor fuel products pass through a valved line 73 into a receiver 74.

The olefinic gases passing through the line 66 which may if desired be supplemented with additional olefinic gas from an outside source through a valved line 66' are compressed by means of a pump or compressor 75 to a high pressure, for example from 1,000 to 3,000 pounds or higher, and are then passed into a coil 76 located in a furnace 77, where they are heated, to a polymerizing temperature of, for example from 850° to 1200° F., and preferably from 1000° to 1100° F., to initiate or effect polymerization of gaseous olefins. The products from the coil 76 may then pass either directly through a line 78 to a condenser 79, or may first pass through a reaction vessel 80. In any event, the time of contact is of the same order of magnitude as that employed in the catalytic gas-polymerization unit. From the condenser 79 the gases and condensate pass to a high-pressure separator 81, where hydrogen and methane may be separated and removed through a valved line 82 while condensate passes through a line 83 having a pressure-reducing valve 84 into a low-pressure separator 85, which may be constructed as a conventional stabilizer if desired.

Gases withdrawn from the low-pressure separator or stabilizer 85, and comparatively rich in olefinic constituents or paraffinic constituents heavier than methane as compared to the gases withdrawn at 82, pass by way of a line 86 having a valve 87 and a pump 88 to the line 11 and thence into the scrubber 14. Condensate may pass through a valved line 90 to a receiver 91, or, where insufficient stabilization has been effected at 85, may be delivered by means of a line 120 having a valve 121 and a pump 122 to the stabilizer 25.

When it is desired to increase the olefinic constituents of the gases withdrawn from the separator 85, a valve 92 located in the line 86 may be closed and the gases from the separator 85 may pass through a line 93 having a valve 94 into a coil 95 located within a gas-cracking furnace 96. The gases passing through the coil 95 are heated to a gas-cracking temperature of for example from 1250° to 1750° F. under a comparatively low pressure of from atmospheric to 200 pounds per square inch and for a comparatively short period of time, for example from one or two seconds to 20 seconds in order to effect a conversion of gaseous paraffins to gaseous olefins. The cracked gases then pass by way of a line 97 having a valve 98 into a drum 99. Oil or olefinic gases may be introduced through the transfer line 97 by means of a line 100 having a pump 101 and a valve 102 for the purpose of quenching the hot gases. Oil, thus introduced in proper quantity, may be utilized as a source of further olefinic gases, which are produced by the cracking of the oil introduced into chamber 99 under the influence of the hot gases.

Residual liquid products which may be formed during the cracking of the gases in the coil 95 or may comprise residual constituents of oil introduced through the line 100 are withdrawn from the drum 99 through a valved line 103 for disposition as desired, while gaseous and vaporous products pass through a line 104 to a condenser 105 and then to a separator 106 where any light condensate may be separated and withdrawn through a line 107. More elaborate fractionating means may of course be provided, especially where oil is introduced at 100. The cracked gases issuing from the separator 106 pass through a line 108 having a pump 109 and a valve 110 into the line 86 and are delivered into the scrubber 14 for concentration.

As will be made clear from the discussion hereinabove, the products collected in the receiver 74 tend to be deficient in light constituents, while those collected in the receiver 91 tend to contain an excess of light constituents. The products collected in these receivers are therefore blended by delivering them in the quantities in which they are produced or in any other desired proportion into a blending tank 111, valved lines 112 and 113 being provided for this purpose. The blended motor-fuel product may then be withdrawn from the blending tank 111 through a valved pipe 114 for use as desired or for further purification. If desired this product may be blended with stabilized gasoline drawn from the stabilizer 25 of the oil-cracking unit from which the gases supplied to the operation are derived.

If desired, a single gas separator may be employed in place of the high- and low-pressure separators 81 and 85. The gases from such a separator may pass either directly to the scrubber 15, or may first pass to the coil 95 for cracking, or may be withdrawn from the system. When two separators 81 and 85 are used, the gases from the separator 81 may, if they contain enough paraffinic constituents heavier than methane to warrant it, be delivered to the coil 95 for cracking to increase the olefinic content thereof, the cracked gases returning to the scrubber 14.

In some instances, it may be desirable to employ the reaction vessel 60 as a gas reversion zone. As shown in Fig. 2, oil, such as reduced crude or other heavy hydrocarbon oil may then be introduced under pressure into the vessel 60 from an outside source through a line 130 having a pump 131 and a valve 132, to undergo cracking and/or reaction with gases in the presence of the catalyst, under the conditions of pressure and temperature set forth hereinabove. In this instance, the line 61 may be provided with a pressure-reducing valve 133 and the products from the vessel 60 pass into an evaporator 134, from which residual products are removed through a valved line 135, while vapors pass through a trap-out tray 136 into the fractionator 62.

The condensate withdrawn at 62' may be separately cracked to produce gasoline for blending with other products in the tank 111.

While I have described my invention with respect to various specific examples and modifications by way of illustrative examples and have illustrated various preferred forms of apparatus for carrying out the various operations incident to my process, it will be understood by those skilled in the art that my invention is not limited to such operative or mechanical details except insofar as set forth in the claims hereinafter made.

I claim:

1. A process of producing motor fuel from cracked hydrocarbon vapors which comprises fractionating said vapors to remove constituents heavier than gasoline, condensing the fractionated vapors, separating uncondensed gases from condensed cracked distillate, passing said condensed distillate to a stabilizing zone, withdrawing from said stabilizing zone a liquid fraction comprising principally butane, scrubbing said uncondensed gases with said butane fraction to remove constituents of higher molecular weight than methane, removing the thereby enriched butane fraction from said gases and distilling it to drive off constituents absorbed from said gases, subjecting the thereby liberated gaseous constituents to polymerization to effect the formation of low-boiling normally liquid hydrocarbons, and recovering said hydrocarbons from the remaining unpolymerized gases.

2. A process of producing motor fuel from cracked hydrocarbon vapors which comprises fractionating said vapors to remove constituents heavier than gasoline, condensing the fractionated vapors, separating uncondensed gases from condensed cracked distillate, passing said condensed distillate to a stabilizing zone, withdrawing from said stabilizing zone a liquid fraction comprising principally butane, scrubbing said uncondensed gases with said butane fraction to remove constituents of higher molecular weight than methane, removing the thereby enriched butane fraction from said gases and distilling it to drive off constituents absorbed from said gases, subjecting the thereby liberated gaseous constituents to polymerization to effect the formation of low-boiling normally liquid hydrocarbons, recovering said hydrocarbons from the remaining unpolymerized gases, withdrawing residual gases from the scrubbing operation, scrubbing them with a solvent heavier than butane to remove butane therefrom, returning thereby recovered butane to the vapors undergoing fractionation.

3. A process of producing motor fuel from cracked hydrocarbon vapors which comprises fractionating said vapors to remove constituents heavier than gasoline, condensing the fractionated vapors, separating uncondensed gases from condensed cracked distillate, passing said condensed distillate to a stabilizing zone, withdrawing from said stabilizing zone a liquid fraction comprising principally butane, scrubbing said uncondensed gases with said butane fraction to remove constituents of higher molecular weight than methane, removing the thereby enriched butane fraction from said gases and distilling it to drive off constituents absorbed from said gases, subjecting the thereby liberated gaseous constituents to polymerization to effect the formation of low-boiling normally liquid hydrocarbons, recovering said hydrocarbons from the remaining unpolymerized gases, scrubbing residual gases from the first-mentioned scrubbing operation with a solvent comprising reflux oil withdrawn from the fractionating step to remove butane therefrom, and returning the thereby butane-enriched solvent to said fractionating step.

4. A process of producing motor fuel from cracked hydrocarbon vapors which comprises fractionating said vapors to remove constituents heavier than gasoline, condensing the fractionated vapors, separating uncondensed gases from condensed cracked distillate, passing said condensed distillate to a stabilizing zone, withdrawing from said stabilizing zone a light overhead vaporous fraction and a heavier liquid fraction comprising principally butane, scrubbing said uncondensed gases and said vaporous fraction with said butane fraction to remove constituents of higher molecular weight than methane, removing the thereby enriched butane fraction from said gases and distilling it to drive off constituents absorbed from said gases, subjecting the thereby liberated gaseous constituents to polymerization to effect the formation of low-boiling normally liquid hydrocarbons, and recovering said hydrocarbons from the remaining unpolymerized gases.

5. A process of producing motor fuel from cracked hydrocarbon vapors which comprises fractionating said vapors to remove constituents heavier than gasoline, condensing the fractionated vapors, separating uncondensed gases from condensed cracked distillate, passing said condensed distillate to a stabilizing zone, withdrawing from said stabilizing zone a light overhead vaporous fraction and a heavier liquid fraction comprising principally butane, scrubbing said uncondensed gases and said vaporous fraction with said butane fraction to remove constituents of higher molecular weight than methane, removing the thereby enriched butane fraction from said gases and distilling it to drive off constituents absorbed from said gases, subjecting the thereby liberated gaseous constituents to polymerization to effect the formation of low-boiling normally liquid hydrocarbons, and recovering said hydrocarbons from the remaining unpolymerized gases and returning at least a portion of said remaining gases to the scrubbing operation.

6. A process of producing motor fuel from cracked hydrocarbon vapors which comprises fractionating said vapors to remove constituents heavier than gasoline, condensing the fractionated vapors, separating uncondensed gases from condensed cracked distillate, passing said condensed distillate to a stabilizing zone, withdrawing from said stabilizing zone a liquid fraction comprising principally butane, scrubbing said uncondensed gases with said butane fraction to remove constituents of higher molecular weight than methane, removing the thereby enriched butane fraction from said gases and distilling it to drive off constituents absorbed from said gases, subjecting the thereby liberated gaseous constituents to polymerization in the presence of a catalyst comprising a metallic halide combined with a polar compound at an elevated temperature and high pressure to effect the formation of low-boiling, normally liquid hydrocarbon oil containing motor fuel deficient in lower boiling constituents, recovering said oil, subjecting residual gases to a higher temperature and pressure to effect a further polymerization of gaseous olefins to normally liquid, low-boiling hydrocarbon oil containing motor fuel deficient in higher boiling constituents, recovering said oil and blending it with the first-mentioned low-boiling hydrocarbon oil to produce a motor fuel product, and returning residual gases to the scrubbing step.

HAROLD V. ATWELL.